(12) United States Patent
Culp et al.

(10) Patent No.: US 11,564,784 B2
(45) Date of Patent: Jan. 31, 2023

(54) SYSTEMS FOR LASER TRIMMING DENTAL ALIGNERS

(71) Applicant: SDC U.S. SMILEPAY SPV, Nashville, TN (US)

(72) Inventors: Clete Culp, Nashville, TN (US); Jordan Katzman, Nashville, TN (US); Steve Cicurel, Nashville (AE); Christopher Yancey, Nashville, TN (US)

(73) Assignee: SDC U.S. SMILEPAY SPV, Nashville, TN (US)

( * ) Notice: Subject to any disclaimer, the term of this patent is extended or adjusted under 35 U.S.C. 154(b) by 371 days.

(21) Appl. No.: 16/851,948

(22) Filed: Apr. 17, 2020

(65) Prior Publication Data

US 2021/0045854 A1 Feb. 18, 2021

Related U.S. Application Data

(63) Continuation of application No. 16/540,259, filed on Aug. 14, 2019, now Pat. No. 10,624,722.

(51) Int. Cl.
*A61C 13/00* (2006.01)
*A61C 7/08* (2006.01)
(Continued)

(52) U.S. Cl.
CPC ............ *A61C 13/0018* (2013.01); *A61C 7/08* (2013.01); *A61C 13/34* (2013.01); *B23K 26/032* (2013.01); *B23K 26/082* (2015.10); *B23K 26/0823* (2013.01); *B23K 26/0861* (2013.01); *B23K 26/0869* (2013.01); *B23K 26/103* (2013.01); *B23K 26/361* (2015.10); *B23K 26/38* (2013.01); *B26D 5/007* (2013.01); *B29C 51/268* (2013.01);
(Continued)

(58) Field of Classification Search
CPC .... A61C 13/0018; A61C 7/08; B23K 26/042; B26D 5/007; B29C 51/268
See application file for complete search history.

(56) References Cited

U.S. PATENT DOCUMENTS 6,974,323 B2   12/2005   Weigl et al.
6,976,627 B1   12/2005   Culp et al.
(Continued)

OTHER PUBLICATIONS

International Search Report and Written Opinion of International Application No. PCT/US2020/046150, dated Oct. 26, 2020, 13 pages.

*Primary Examiner* — Benjamin A Schiffman
(74) *Attorney, Agent, or Firm* — Foley & Lardner LLP

(57) ABSTRACT

A system includes an orientation determination system comprising a camera where the camera is configured to capture an image of an orientation feature of a physical dental model of a dental arch of a customer with material thermoformed thereon. The orientation determination system is configured to identify an offset of the physical dental model with respect to a fixture plate during positioning or before or after the physical dental model is positioned on the fixture plate by determining an actual orientation of the physical dental model based on the orientation feature. The system also includes a laser trimming system configured to cut the material along a trim line based on the identified offset while the fixture plate is moved about at least two axes to produce a dental aligner specific to the customer and being configured to reposition one or more teeth of the customer.

20 Claims, 8 Drawing Sheets

(51) Int. Cl.
*B23K 26/00* (2014.01)
*B23K 26/38* (2014.01)
*A61C 13/34* (2006.01)
*B23K 26/03* (2006.01)
*B23K 26/08* (2014.01)
*B26D 5/00* (2006.01)
*B29C 51/26* (2006.01)
*B23K 26/082* (2014.01)
*B23K 26/10* (2006.01)
*B23K 26/361* (2014.01)
*B23K 103/00* (2006.01)
*B23K 26/402* (2014.01)
*B23K 26/06* (2014.01)
*B29L 31/00* (2006.01)
*B29C 51/10* (2006.01)

(52) U.S. Cl.
CPC ...... *B23K 26/0093* (2013.01); *B23K 26/0626* (2013.01); *B23K 26/402* (2013.01); *B23K 2103/42* (2018.08); *B29C 51/10* (2013.01); *B29C 2793/009* (2013.01); *B29C 2793/0009* (2013.01); *B29L 2031/753* (2013.01)

(56) References Cited

U.S. PATENT DOCUMENTS

| | | |
|---|---|---|
| 7,092,784 B1 | 8/2006 | Simkins |
| 7,261,533 B2 | 8/2007 | Wrosz et al. |
| 7,293,988 B2 | 11/2007 | Wen |
| 7,306,152 B2 | 12/2007 | Culp et al. |
| 7,309,230 B2 | 12/2007 | Wen |
| 7,329,122 B1 | 2/2008 | Scott |
| 7,335,024 B2 | 2/2008 | Wen |
| 7,384,266 B2 | 6/2008 | Wen |
| 7,435,084 B2 | 10/2008 | Liu et al. |
| 7,572,121 B2 | 8/2009 | Wrosz et al. |
| 7,604,181 B2 | 10/2009 | Culp et al. |
| 7,611,058 B2 | 11/2009 | Culp et al. |
| 7,711,447 B2 | 5/2010 | Lu et al. |
| 7,831,322 B2 | 11/2010 | Liu et al. |
| 7,840,373 B2 | 11/2010 | Culp et al. |
| 7,905,408 B2 | 3/2011 | Culp et al. |
| 7,922,490 B2 | 4/2011 | Wen |
| 7,950,131 B2 | 5/2011 | Hilliard |
| 7,957,824 B2 | 6/2011 | Boronvinskih et al. |
| 7,993,134 B2 | 8/2011 | Wen |
| 7,993,136 B2 | 8/2011 | Wen |
| 8,030,588 B2 | 10/2011 | Culp et al. |
| 8,047,846 B2 | 11/2011 | Wen |
| 8,060,236 B2 | 11/2011 | Hilliard |
| 8,155,780 B2 | 4/2012 | Lu et al. |
| 8,383,977 B2 | 2/2013 | Culp et al. |
| 8,419,430 B2 | 4/2013 | Pogorelsky |
| 8,491,305 B2 | 7/2013 | Pogorelsky |
| 8,517,726 B2 | 8/2013 | Kakavand et al. |
| 8,634,948 B2 | 1/2014 | Boronvinskih et al. |
| 8,636,513 B2 | 1/2014 | Wen |
| 8,871,132 B2 | 10/2014 | Abels et al. |
| 9,011,149 B2 | 4/2015 | Wen |
| 9,108,338 B2 | 8/2015 | Sirovskiy et al. |
| 9,152,145 B2 | 10/2015 | Culp et al. |
| 9,242,118 B2 | 1/2016 | Brawn |
| 9,299,192 B2 | 3/2016 | Kopelman |
| 9,403,238 B2 | 8/2016 | Culp |
| 9,456,882 B2 | 10/2016 | Huffman |
| 9,536,020 B2 | 1/2017 | Wen |
| 9,691,110 B2 | 6/2017 | Boronvinskih et al. |
| 9,700,391 B2 | 7/2017 | Kounga et al. |
| 9,730,780 B2 | 8/2017 | Brawn et al. |
| 9,943,382 B2 | 4/2018 | Wen |
| 10,011,050 B2 | 7/2018 | Kitching et al. |
| 10,099,256 B2 | 10/2018 | Culp et al. |
| 10,195,690 B2 | 2/2019 | Culp |
| 10,426,574 B2 | 10/2019 | Raby et al. |
| 2003/0207227 A1 | 11/2003 | Abolfathi |
| 2004/0152036 A1 | 8/2004 | Abolfathi |
| 2004/0197728 A1 | 10/2004 | Abolfathi et al. |
| 2004/0243361 A1 | 12/2004 | Steuben et al. |
| 2005/0082703 A1 | 4/2005 | Wrosz |
| 2006/0093987 A1 | 5/2006 | Wen |
| 2006/0093993 A1 | 5/2006 | Wen |
| 2006/0102725 A1 | 5/2006 | Culp et al. |
| 2006/0127838 A1 | 6/2006 | Liu et al. |
| 2006/0127850 A1 | 6/2006 | Wen |
| 2006/0127851 A1 | 6/2006 | Wen |
| 2006/0127853 A1 | 6/2006 | Wen |
| 2006/0127855 A1 | 6/2006 | Wen |
| 2006/0127856 A1 | 6/2006 | Wen |
| 2006/0127857 A1 | 6/2006 | Liu et al. |
| 2006/0127858 A1 | 6/2006 | Wen |
| 2006/0127859 A1 | 6/2006 | Wen |
| 2006/0127860 A1 | 6/2006 | Wen |
| 2006/0172259 A1 | 8/2006 | Wen |
| 2006/0199142 A1 | 9/2006 | Liu et al. |
| 2006/0199145 A1 | 9/2006 | Liu et al. |
| 2006/0199153 A1 | 9/2006 | Liu et al. |
| 2006/0275736 A1 | 12/2006 | Wen et al. |
| 2007/0164113 A1 | 7/2007 | Culp et al. |
| 2007/0243502 A1 | 10/2007 | Wen |
| 2008/0050692 A1 | 2/2008 | Hilliard |
| 2008/0102415 A1 | 5/2008 | Scott |
| 2008/0141534 A1 | 6/2008 | Hilliard |
| 2008/0215176 A1 | 9/2008 | Borovinskih et al. |
| 2008/0280246 A1 | 11/2008 | Wen |
| 2008/0280258 A1 | 11/2008 | Wen |
| 2008/0280259 A1 | 11/2008 | Wen |
| 2008/0292741 A1 | 11/2008 | Wrosz et al. |
| 2009/0053669 A1 | 2/2009 | Liu et al. |
| 2011/0104639 A1 | 5/2011 | Pogorelsky |
| 2011/0104640 A1 | 5/2011 | Pogorelsky |
| 2011/0183295 A1 | 7/2011 | Boronvinskih et al. |
| 2011/0213483 A1 | 9/2011 | Boronvinskih et al. |
| 2011/0236849 A1 | 9/2011 | Pogorelsky |
| 2012/0028220 A1 | 2/2012 | Wen |
| 2013/0073071 A1 | 3/2013 | Culp |
| 2013/0110469 A1 | 5/2013 | Kopelman |
| 2014/0131908 A1 | 5/2014 | Sun et al. |
| 2014/0315153 A1 | 10/2014 | Kitching et al. |
| 2015/0220662 A1 | 8/2015 | Wen |
| 2015/0314520 A1 | 11/2015 | Sirovskiy et al. |
| 2016/0058527 A1 | 3/2016 | Schumacher |
| 2016/0166357 A1 | 6/2016 | Portalupi |
| 2016/0171128 A1 | 6/2016 | Kopelman |
| 2016/0237541 A1 | 8/2016 | Patel et al. |
| 2017/0065372 A1 | 3/2017 | Mah |
| 2017/0079749 A1 | 3/2017 | Wen |
| 2017/0100211 A1 | 4/2017 | Wen |
| 2017/0100214 A1 | 4/2017 | Wen |
| 2017/0112594 A1 | 4/2017 | Hilliard |
| 2017/0189154 A1 | 7/2017 | Allen et al. |
| 2017/0270238 A1 | 9/2017 | Borovinskih et al. |
| 2017/0367791 A1 | 12/2017 | Raby et al. |
| 2017/0367792 A1 | 12/2017 | Raby et al. |
| 2018/0000564 A1 | 1/2018 | Cam et al. |
| 2018/0008389 A1 | 1/2018 | Allen et al. |
| 2018/0049847 A1 | 2/2018 | Oda et al. |
| 2018/0116762 A1 | 5/2018 | Kopelman |
| 2018/0153648 A1 | 6/2018 | Shanjani et al. |
| 2018/0200034 A1 | 7/2018 | Deville et al. |
| 2018/0243052 A1 | 8/2018 | Lee |
| 2018/0250098 A1 | 9/2018 | Wen |
| 2018/0304497 A1 | 10/2018 | Kitching et al. |
| 2019/0039100 A1 | 2/2019 | Culp et al. |
| 2019/0102880 A1 | 4/2019 | Parpara et al. |
| 2019/0160590 A1 | 5/2019 | Culp |
| 2019/0321136 A1 | 10/2019 | Martz et al. |
| 2019/0328494 A1 | 10/2019 | Barone et al. |

SYSTEMS FOR LASER TRIMMING DENTAL ALIGNERS

CROSS-REFERENCE TO RELATED APPLICATIONS

This application is a continuation of U.S. patent application Ser. No. 16/540,259 filed Aug. 14, 2019, which is incorporated herein by reference in its entirety.

BACKGROUND

The present disclosure relates generally to manufacturing dental aligners. More specifically, the present disclosure relates to trimming or cutting dental aligners.

Dental aligners for repositioning teeth may be worn by a patient receiving orthodontic treatment. Some dental aligners are fabricated by thermoforming a material to a dental mold. After thermoforming the material to the dental mold, the formed aligner is cut and removed from the dental mold so that the aligner can be worn by the patient.

SUMMARY

At least one embodiment relates to a method. The method includes receiving, by a model positioning system, a physical dental model of a dental arch of a user with a material thermoformed to the physical dental model. The physical dental model includes an orientation feature. The method includes moving, by the model positioning system, the physical dental model to a position in which the orientation feature is viewable by a camera of an orientation determination system. The camera captures an image of the orientation feature of the physical dental model. The method includes identifying, by the orientation determination system, an offset of the physical dental model by determining an actual orientation of the physical dental model before or after the physical dental model is positioned on a fixture plate based on the image of the orientation feature. The method includes cutting, by a laser trimming system while the fixture plate is moved about at least two axes relative to the laser trimming system, the material on the physical dental model. The laser trimming system cuts the material along a trim line beginning at a first point corresponding to a starting point of the trim line. The first point is determined based on the identified offset of the physical dental model, the laser trimming system cutting the material along the trim line to produce a dental aligner specific to the user and being configured to reposition one or more teeth of the user.

Another embodiment relates to a system. The system includes a model positioning system configured to receive a physical dental model of a dental arch of a user with a material thermoformed thereon. The physical dental model includes an orientation feature. The model positioning system is configured to move the physical dental model to a position in which the orientation feature is viewable by a camera. The system includes an orientation determination system that includes the camera, and the camera is configured to capture an image of the orientation feature of the physical dental model when the model positioning system moves the physical dental model into the position. The orientation determination system is configured to identify an offset of the physical dental model before or after the physical dental is positioned on the fixture plate by determining an actual orientation of the physical dental model based on the orientation feature. The system includes a laser trimming system configured to cut the material from the physical dental model along a trim line while the fixture plate is moved about at least two axes relative to the laser cutting system. The trim line begins at a first point corresponding to a starting point of the trim line, the first point determined based on the identified offset of the physical dental model. The laser trimming system is configured to cut the material along the trim line to produce a dental aligner specific to the user and being configured to reposition one or more teeth of the user.

Another embodiment relates to a system. The system includes a model positioning system, an orientation determination system, and a laser trimming system. The model positioning system is configured to receive a physical dental model of a dental arch of a user having a material thermoformed thereto. The physical dental model includes an orientation feature material. The model positioning system is configured to expose the orientation feature to a camera. The orientation determination system is configured to identify an offset of the physical dental model to be placed on a fixture plate or already placed on a fixture plate based on an image captured by the camera of the orientation feature. The laser trimming system is configured to cut the material from the physical dental model along a trim line while the fixture plate is moved about at least two axes relative to the laser trimming system. The trim line begins at a first point corresponding to a starting point of the trim line. The first point is determined based on the identified offset of the physical dental model. The laser trimming system is configured to cut the material along the trim line to produce a dental aligner specific to the user and being configured to reposition one or more teeth of the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for trimming intraoral devices, such as dental aligners. A trimming system is configured to shape and trim excess material thermoformed over a dental model to produce a dental aligner. The trimming system includes components configured to position, reposition, adjust and manipulate the dental models according to dental model data associated with the dental models. The trimming system includes one or more sensors for identifying, generating, or otherwise determining data from the dental models, which are specific to the dental models. The sensors may also be configured to detect reference points to aid the trimming system in establishing, detecting, or otherwise determining the orientation of the dental models. The trimming system is configured to manipulate the dental models according to the dental model data and identified orientation to trim the excess material from the dental models, thus forming dental aligners for use by a user.

Figure 1:
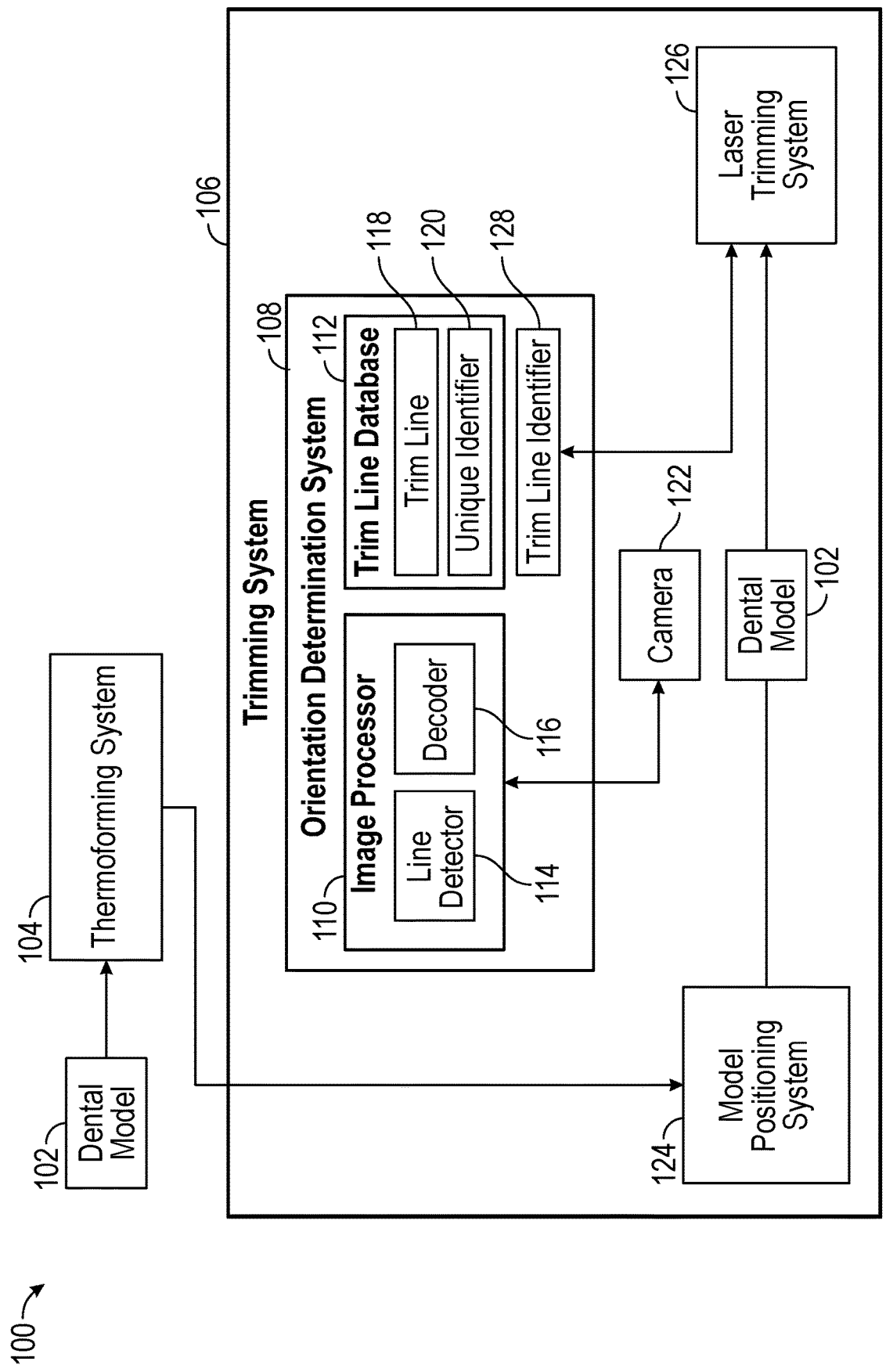
FIG. 1 is a block diagram showing a system for trimming dental aligners, according to an illustrative embodiment.

Referring now to FIG. 1, an embodiment of a system 100 for trimming dental aligners is shown. The system 100 may operate in conjunction with other systems, and may also include equipment and components as shown in subsequent figures and later described. The system 100 is shown to include a thermoforming system 104 and a trimming system 106 having a physical model positioning system 124, an orientation determination system 108, and a laser trimming system 126. The thermoforming system 104 includes any device, component, or group of devices or components configured to thermoform material (e.g., using one or more thermoforming processes) to an outer surface of a dental model 102 representing a current or repositioned dentition of a user. The physical dental model 102 is representative of a user's oral features, and may be created based on an impression taken of the user's oral features. In some embodiments, the dental model 102 may be generated using various model generators and model generation methods based on a two-dimensional photograph or three-dimensional scan of the user's oral features. The thermoforming system 104 is configured to thermoform a material to the dental model 102 by heating the material and applying the heated material to the surface of the dental model 102. The thermoforming system 104 may remove air between the material and a surface of the dental model 102 such that the material takes the shape of the surface of the dental model. As such, the material conformed to the surface of the dental model 102 corresponds to and is complementary to the dental model 102. In system 100, the dental model 102 with the material thermoformed thereon may be manipulated and/or transferred to and between one or more subsystems (e.g., from the thermoforming system 104 to the trimming system 106).

Following thermoforming, the dental model 102 with the thermoformed material is moved to trimming system 106, which includes the model positioning system 124, as shown in FIG. 1. In some embodiments, this may involve transferring the dental model 102 and the corresponding thermoformed material to the model positioning system 124 through one or more of a variety of means, which may include a conveyor belt, one or more robotic arms, by a technician, and/or other methods. The dental model 102 may be mounted, coupled, or otherwise attached to a fixture stage (e.g., via the robotic arm(s), manual placement of the dental model 102 on the fixture stage, and so forth) at the trimming system 106.

When the dental model 102 is positioned on the fixture stage, the dental model 102 may be positioned at a slight offset due to various limitations and physical constraints of positioning the dental model 102. Hence, each dental model 102 may be oriented or positioned in a slightly different manner. Such variations may cause offsets and errors in the trimming process. For instance, where the exact orientation of the dental model 102 is unknown, the laser trimming system 126 may trim the material from the dental model 102 at an offset from a desired trim line. According to the implementations and embodiments described herein, the trimming system 106 may include an orientation determination system 108 configured to determine an orientation of the dental model 102 with respect to the fixture stage or with respect to an indicator on the fixture stage. The orientation determination system 108 may be configured to determine the orientation to compensate for any potential variations in the orientation or position of the dental model 102 to ensure that material thermoformed on the dental model 102 is cut as intended. As such, the dental aligners produced by trimming the material from the dental model may be more accurate and consistent.

The model positioning system 124 may receive the dental model 102 with the material thermoformed thereon. For example, the model positioning system 124 may receive the dental model 102 by picking the dental model and thermoformed material up from a pallet and position the dental model 102 onto a fixture plate of a fixture stage, as described in greater detail below. The fixture stage is configured to retain the dental model 102 and the thermoformed material in a specific position or orientation. Additionally, the dental model 102 and/or the thermoformed material may include physical features configured to interface with complimentary physical features that promote retention of the dental model 102 in a specific position or orientation on the fixture stage while the fixture stage moves the dental model 102. Physical features may include protrusions and complimentary/corresponding notches, as well as other possible retention mechanisms such as male and female components of pegs and bores, for example.

The model positioning system 124 may be configured to position and/or reposition the dental model 102 such that the orientation determination system 108 may perform various operations on and/or relating to the dental model 102. For example, the model positioning system 124 may place, pick up, move, transfer, or otherwise manipulate the dental model 102 into one or more possible positions or areas such that the orientation determination system 108 may identify one or more specific features and/or characteristics of the dental model 102. The orientation determination system 108 may perform various operations to determine the orientation of the dental model 102 that involve manipulation of the dental model 102 by the model positioning system 124. For example, the dental model 102 and/or the thermoformed material may have various markers or reference points that are to be identified by the orientation determination system 108 as well as components thereof.

The orientation determination system 108 is shown to include a camera 122. The camera 122 is configured to function in conjunction with an image processor 110. In some embodiments, the camera 122 may be configured to communicate with the image processor 110 through one or more wired or wireless communication means. The model positioning system 124 positions the dental model 102 in a position and/or orientation that is conducive to the camera 122 capturing an image (e.g., from proper distances, angles, and other parameters that may be required depending on the specific model, thermoformed material, camera, or other components) to be communicated and analyzed and otherwise processed by the image processor 110. As one example, the model positioning system 124 lifts and rotates the dental model 102 towards the camera 122 to expose an underside of the dental model 102. The camera 122 is configured to capture an image of the underside of the dental model 102. The camera 122 is configured to transmit the captured image to the image processor 110. The image processor 110 may implement various methods, algorithms, and other techniques to process various images and components of images of the dental model 102 that have been captured by camera 122. The image processor 110 may include a line detector 114 and decoder 116 configured to process various features of the dental model 102 for identifying the dental model 102 and determining the orientation of the dental model 102, as described in greater detail below.

Figure 2A:
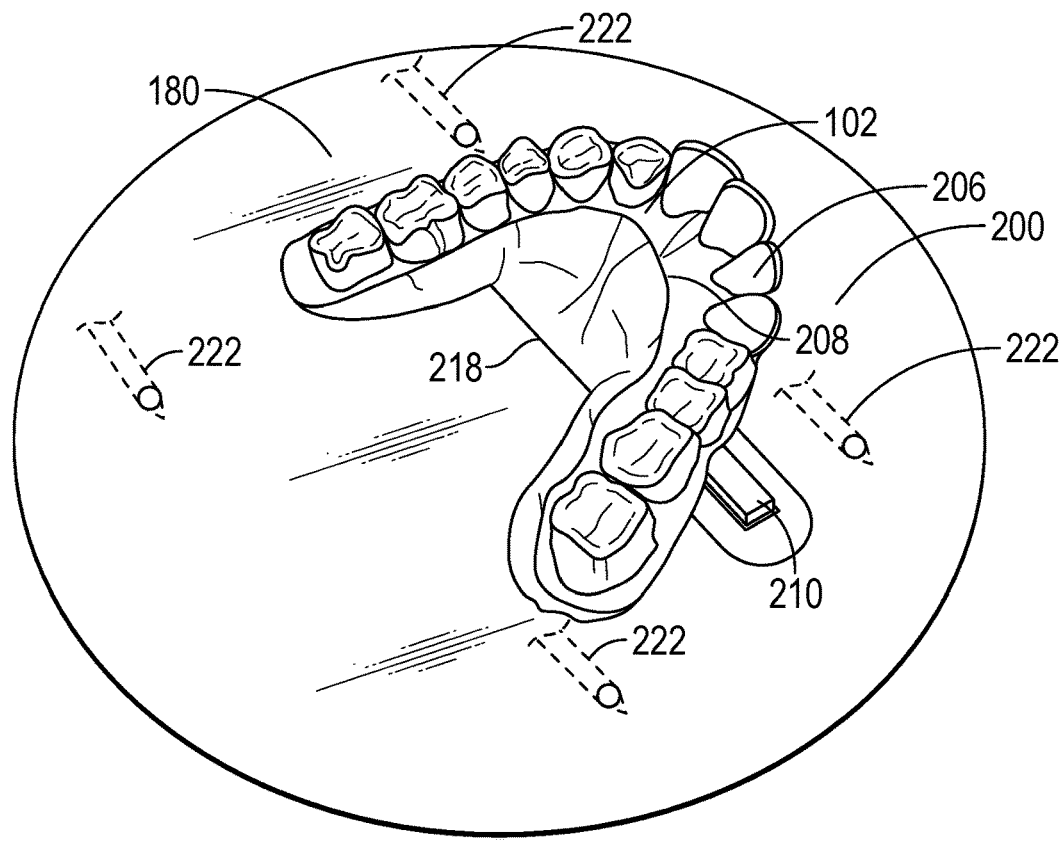
FIG. 2A is a perspective view of a top side of a dental model with a material thermoformed over the top side, according to an illustrative embodiment.
Figure 2B:
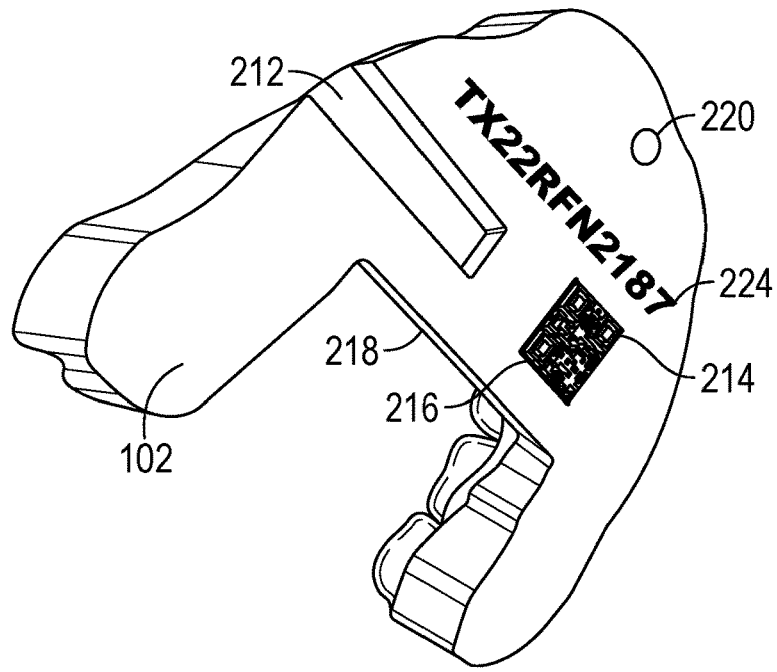
FIG. 2B is a perspective view of an underside of a dental model, according to an illustrative embodiment.

Referring now to FIGS. 2A and 2B, perspective views of a top side and bottom side of the dental model 102 are shown, according to illustrative embodiments. The dental model 102 may be the same as or similar to the dental model 102 of FIG. 1. The dental model 102 is shown to model various oral features of a user, such as teeth either in a current state or in an offset position to reposition the teeth of the user. The dental model 102 includes a dental arch portion 208 corresponding to a dental arch of the user with the dental arch portion 208 comprising a plurality of teeth portions 206 corresponding to teeth of the user. In FIG. 2A, the dental model is shown with an excess portion 200 of the material thermoformed thereon extending beyond the dental model 102, and the dental model 102 is shown to be mounted or coupled to a retention mechanism 210 (e.g., of a fixture plate, not shown) configured to maintain a position of the dental model 102. For instance, the dental model 102 may include features which are configured to function cooperatively with a fixture plate of a fixture stage at the cutting station 310, as described in greater detail below. The dental model 102 may include a recess 212 configured to interface with the retention mechanism 210, such as a bar that is configured to fit into the recess 212 of the dental model 102. Similarly, the dental model 102 may include a bore 220 configured to interface with a post or protrusion. The recess 212 and bore 220 function cooperatively with features of the fixture plate of the fixture stage to maintain a position of the dental model 102 with respect to the fixture plate, or with features of a pallet to maintain a position of the dental model 102 on the pallet.

Referring to FIG. 1-FIG. 2B, the line detector 114 and the decoder 116 are configured to identify features on the dental model 102 in images captured by the camera 122. As shown in FIG. 2B, the dental model 102 includes a data matrix 214, which is shown to be a QR code in the illustrative embodiment of FIG. 2B. In some implementations, the dental model 102 further includes a model identification code 224. The model identification code 224 may be or include an alphanumerical code which is uniquely associated with the dental model 102. The data matrix 214 and model identification code 224 may be used (e.g., together, separate) for uniquely identifying the dental model 102, as described in greater detail below.

The data matrix 214 includes a reference point 216, which is shown to be a right angle formed by a pair of lines defining or following a corner of the data matrix 214 as shown in FIG. 2B. The reference point 216 may be positioned in a known location relative to the dental model 102. For instance, in the embodiment shown in FIG. 2B, the reference point 216 is positioned on an underside of the dental model 102. The reference point 216 may be formed in a known location and orientation such that the orientation determination system 108 is configured to determine an orientation of the dental model 102 based on the orientation of the reference point 216. The line detector 114 of the image processor 110 is configured to identify one or more lines on the dental model 102 and/or the thermoformed material, which comprise the reference point 216. The line detector 114 may be configured to analyze, process, or otherwise detect the pair of lines based on characteristics of the data matrix 214. For instance, the pair of lines may be bolded, contrasted with a background color of the dental model 102, or otherwise be uniquely formed to be identifiable within an image. The line detector 114 may be configured to detect the lines by identifying the data matrix 214 and locating the contrast, which defines the pair of lines against the background of the dental model 102. As such, the lines, which form the reference point 216 are formed in and/or on the dental model 102 such that the line detector 114 is configured to detect the lines. In some embodiments, the data matrix 214 and/or the reference point 216 may include variations in color, contrast, shape, or other parameters that enable recognition by the image processor 110.

The image processor 110 may be configured to identify, detect, or otherwise determine an orientation of the dental model 102 based on the location of the reference point 216. The reference point 216 may be oriented on the underside of the dental model 102 such that one of the pair of lines forming the reference point 216 follows an edge 218 of the dental model 102 and the other line is perpendicular to the edge 218. By identifying the reference point 216 (e.g., via the line detector 114), the image processor 110 may be configured to locate the edge 218. The image processor 110 may be configured to determine the orientation/position of the dental model 102 based on the edge 218. By identifying the orientation/position of the dental model 102, the image processor 110 is configured to determine if the dental model 102 has been moved, misplaced, shifted position, or otherwise offset. As such, the reference point 216 allows for the line detector 114, in conjunction with other components, to identify and subsequently correct any such offset. Based on the determination of the position and orientation of the dental model 102 by the model positioning system 124, the trimming system 106 is configured to compensate for the offset of the dental model 102 during trimming of the material from the dental model 102 to form the dental aligners 700 (of FIG. 7) to prepare them for use by the user.

In some embodiments, the orientation determination system 108 is configured to store, include, or otherwise access data corresponding to a known position and orientation of the camera 122 within the orientation determination system 108. As stated above, the reference point 216 may be positioned in a known location relative to an edge 218 of the dental model 102. The orientation determination system 108 is configured to process the image(s) from the camera 122 to identify the reference point 216 of the dental model 102. Since the orientation/position of the camera 122 is known, the orientation determination system 108 determines the orientation of the dental model 102 based on the orientation of the reference point 216 within the image (e.g., the perspective of the dental model 102 from the camera 122).

In some embodiments, the orientation determination system 108 may compare the orientation of the reference point 216 within the image with one or more stored images corresponding to a known orientation of a sample dental model. The orientation determination system 108 may determine whether the orientation of the reference point 216 matches the orientation of a sample reference point of the sample dental model. In some implementations, the orientation determination system 108 may superimpose or otherwise overlay the image captured by the camera 122 with the stored image(s) to compare the reference point 216 with the sample reference point. Where an offset is not present, the reference points have the same orientation in the overlaid images. However, where the dental model is offset, the reference points are not aligned in the overlaid images. Where the orientations do not match, the orientation determination system 108 determines that an offset is present. The orientation determination system 108 can determine the degree offset based on a comparison of the lines, which form the reference point 216. For example, where the reference point is known to form a 90° angle and the image captured by the camera 122 is overlaid onto a sample image, the orientation determination system 108 can determine the degree offset based on one of the lines in the image captured by the camera 122 in comparison to a corresponding line in the sample image.

The trimming system 106 is configured to identify or select a trim line 118 within a trim line database 112 based on data encoded in the data matrix 214. The decoder 116 is configured to identify the data matrix 214 in the images captured by the camera 122, and decode the data matrix 214 to access information relevant to the dental model 102. In some embodiments, the decoder 116 accesses information relative to the dental model 102 including identification of the specific model (for instance, a user and model number within a series of models), which may be one in a series of models, trim line data specific to the dental model 102 and/or said series of models, as well as other possible data specific to the dental model 102 based on data encoded in the data matrix 214. The data matrix 214 may include a unique identifier encoded therein (such as in the QR code). The decoder 116 is configured to decode the data matrix 214 and identify the unique identifier associated with the dental model. The orientation determination system 108 is configured to access information pertaining to the dental model 102 and/or a series of dental models based on the unique identifier encoded in the data matrix 214. In some implementations, the orientation determination system 108 is configured to verify, validate, or otherwise confirm the identity of the dental model 102 determined based on the model identification code 224. For instance, the orientation determination system 108 may perform an initial identification of the dental model 102 using the data matrix 214, and confirm the identity of the dental mode 102 using the model identification code 224. In some embodiments, the orientation determination system 108 determines the identity of the dental model 102 using the data matrix 214 and displays a corresponding alphanumerical code on a display for a user to cross-reference against the model identification code 224 located on the dental model 102.

The orientation determination system 108 is also shown to include a trim line database 112, which includes a plurality of trim lines 118 and corresponding unique identifiers 120. Each of the trim lines 118 may be indexed within the trim line database 112 by the corresponding unique identifiers 120. Each trim line 118 is configured as an identified line or path specific to the dental model 102 for which a portion of the thermoformed material is to be trimmed from the dental model 102, and further serves as a starting point as to where the dental model 102 and the associated thermoformed material is to be trimmed. The trim line 118 may comprise a series of points on the dental model 102, for example, with the series of points located on the model such that, when each of the points are followed by the laser trimming system 126, the material is trimmed from the dental model 102 to produce the dental aligner.

The orientation determination system 108 is shown to include a trim line identifier 128 communicably coupled to the trim line database 112. The trim line identifier 128 may include any device, component, or group of device(s) or components designed or implemented to identify a trim line corresponding to the dental model 102. The trim line identifier 128 may be configured to identify the trim line based on the unique identifier encoded in the data matrix 214. The trim line identifier 128 may be configured to receive the unique identifier decoded by the decoder 116 based on the image of the dental model 102 captured by the camera 122. The trim line identifier 128 may be configured to perform a look-up function within the trim line database 112 using the unique identifier to identify a corresponding trim line 118.

The trim line identifier 128 may be configured to perform one or more adjustments of the trim line extracted, identified, or otherwise received from the trim line database 112 based on the determined orientation of the dental model 102. The trim line identifier 128 adjusts the trim line to compensate for the offset of the dental model 102. The trim line identifier 128 may be configured to adjust the trim line by rotating the trim line by the degree offset. For instance, where the dental model 102 is offset by 2°, the trim line identifier 128 may rotate the trim line relative to the dental model 102 by 2° in the same direction as the offset. Each trim line may include a starting point. The starting point may be a point at which the laser trimming system 126 first cuts the material from the dental model 102. The trim line identifier 128 may be configured to select, identify, or otherwise determine a first point on the dental model 102 corresponding to the starting point of the trim line to compensate for the offset of the dental model 102. The first point may be a point on the dental model 102 at which the laser trimming system 126 first cuts the material from the dental model 102 and corresponds to the starting point of the trim line. Hence, the first point may be offset from the starting point by the offset of the dental model 102.

The trim line identifier 128 is shown to be communicably coupled to the laser trimming system 126, as shown in FIG. 1. The laser trimming system 126 is configured to receive various data from the trim line database 112 via the trim line identifier 128. The trim line identifier 128 is configured to communicate the identified trim line from the trim line database 112 (e.g., following adjustments of the trim line to compensate for offsets of the dental model 102) to the laser trimming system 126 such that the laser trimming system 126 is configured to trim the thermoformed material from the dental model 102 to remove excess thermoformed material from the dental model 102.

The laser trimming system 126 is also shown to be mechanically coupled (e.g., directly or indirectly) with the model positioning system 124. The laser trimming system 126 is configured to receive the dental model 102 and the thermoformed material from the model positioning system 124. As described in greater detail below, the dental model 102 may be mounted to a fixture plate of a fixture stage. The coupling of the dental model 102 to the fixture plate facilitates movement about five axes as the laser trimming process is conducted by the laser trimming system 126. It will be appreciated that additional axes of movement are also possible, such as six, seven, eight, nine, ten, or more axes of movement. In receiving the dental model 102 from the model positioning system 124, the laser trimming system 126 may adjust its position to facilitate proper trimming of the material from the dental model 102. The laser trimming system 126 may be configured to receive the adjusted trim line from the trim line identifier 128, and the dental model 102 with the material from the model positioning system 124. The laser trimming system 126 may be configured to cut the material from the dental model 102 along the adjusted trim line to produce dental aligners 700.

Referring now to FIG. 3 through FIG. 6, a system 300 for laser trimming is shown. The system 300 may be similar to the laser trimming system 126 as shown in FIG. 1. The system 300 is configured to perform laser trimming operations on dental models similar to the dental model 102 depicted in FIG. 2A and FIG. 2B.

The system 300 is shown to include a pallet loading area 302, which is configured to prepare pallets 304 for laser trimming by other components of the system 300. The pallets 304 are configured to accommodate the dental models 102 and material, which has been thermoformed to the dental models 102. The dental models 102 and/or pallets 304 may include one or more components, such as complimentary protrusions and/or recesses, configured to retain the dental models 102 in a desired position and orientation. The pallet loading area 302 is configured to index and que the pallets 304 according to user and/or operator preferences after a user/operator has loaded the dental models 102 and thermoformed material onto the pallets 304. As such, the pallet loading area 302 is configured to contain various pallets 304 within a que for the laser trimming process performed by the system 300.

Figure 3:
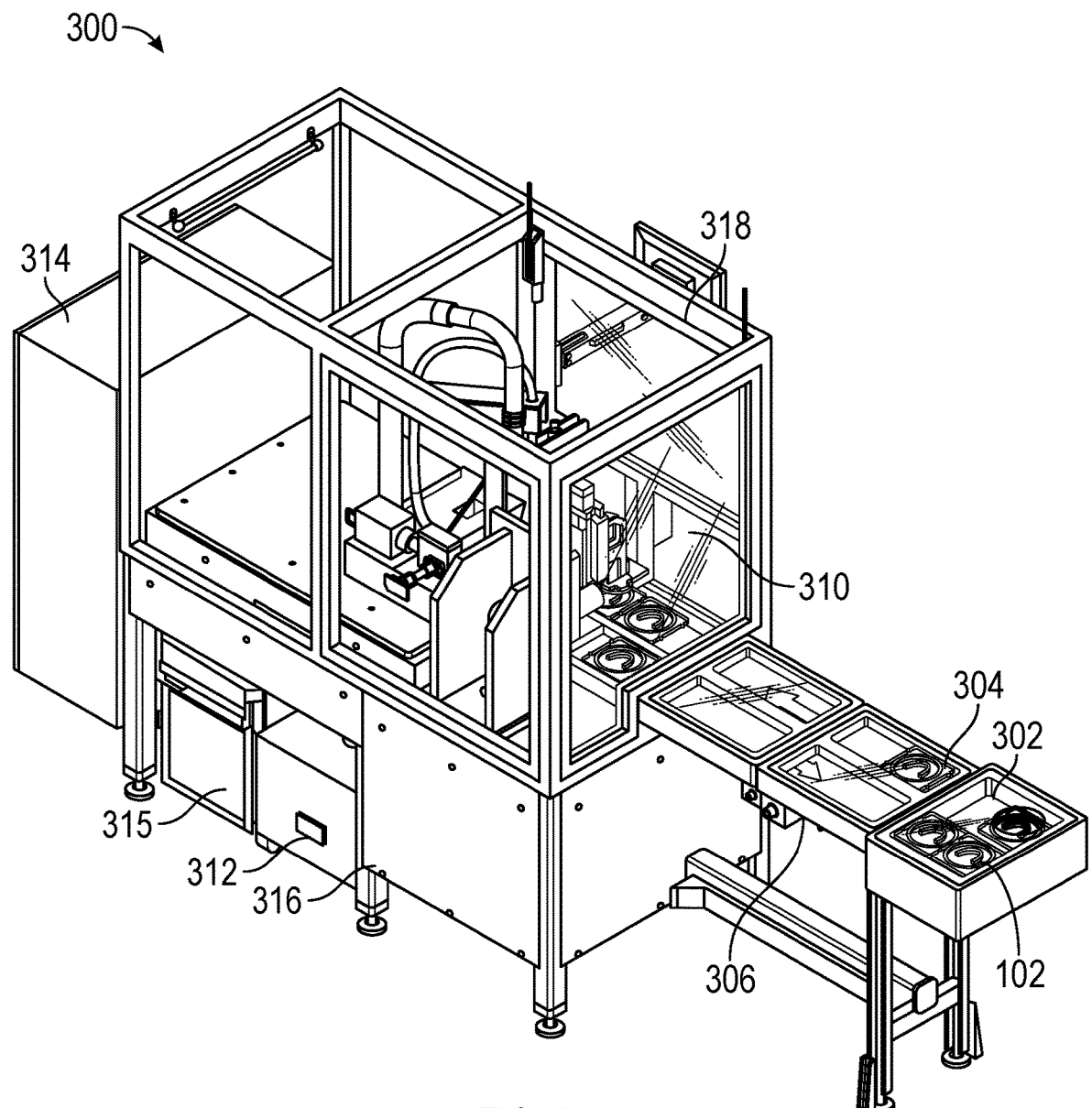
FIG. 3 is an illustration of an upper rear view of the system for trimming dental aligners, according to an illustrative embodiment.
Figure 4:
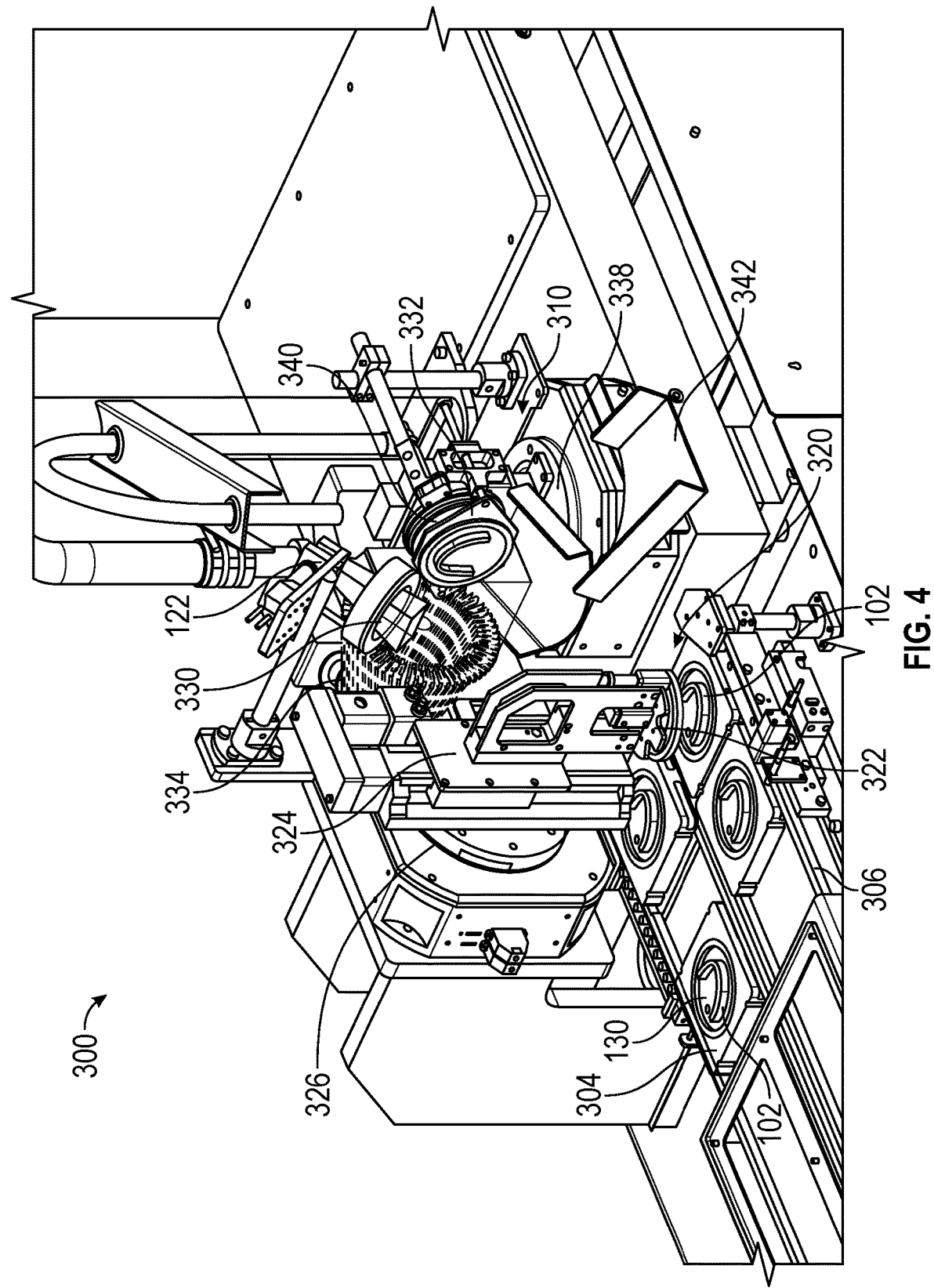
FIG. 4 is an illustration of a front view of the system for trimming dental aligners of FIG. 3, according to an illustrative embodiment.

The pallets 304 are positioned on conveyors 306 after being indexed according to user/operator preferences in the pallet loading area 302. The conveyors 306 are configured along the pallet loading area 302 spanning between the pallet loading area 302 and the cutting station 310. The conveyors 306 are shown to move both from the pallet loading area 302 to a cutting station 310 and from the cutting station 310 to the pallet loading area 302. As shown in FIG. 3 and FIG. 4, the conveyor 306 moving from the pallet loading area 302 toward the cutting station 310 contain one or more pallets 304 which subsequently contain one or more of the dental models 102. The conveyors 306 can be configured to move at least one of the dental models 102 and the dental aligners 700 from the cutting station toward the pallet loading area, or at least one of the dental models 102 and the dental aligners 700 can be processed by components of the system 300 within the cutting station 310 such that the conveyors 306 extending from the last trimming area to the pallet loading area is empty or only contains the dental models 102 (e.g., the dental aligners 700 and the dental models 102 are moved to different locations separate from one another).

The pallets 304 are configured to retain and transport the dental models 102 to a cutting station 310. As shown in FIG. 2A, material is already thermoformed to the dental models 102 when the dental models 102 are positioned on the pallets 304. The material may be thermoformed to the dental models 102 such that the excess portion 200 of the material extends beyond the dental model 102 and across the pallet 304. Each of the pallets 304 may include respective retention mechanisms 210 to maintain a position of the dental models 102 on the pallets 304 while the pallets 304 are moved between the pallet loading area 302 and cutting station 310. As such, the pallets 304 are configured to retain and transport the dental models 102 having the excess material 200 to the cutting station 310 to be processed within the cutting station 310 (e.g., to remove the excess material 200 and form a dental aligner 700). The cutting station 310 is defined by an enclosure 318, as shown in FIG. 3. The enclosure 318 houses various components shown and described in subsequent figures. A base 316 may support the cutting station 310, the enclosure 318 and the components/elements thereof. The base 316 is configured to support the conveyor 306 and the pallet loading area 302 via a beam extending between the base 316 and legs beneath the pallet loading area 302.

The system 300 is also shown to include a fume extraction system 312 and a laser chiller 315. The fume extraction system 312 and the laser chiller 315 are shown to be arranged within the base 316 adjacent the cutting station 310 and the enclosure 318. The fume extraction system 312 is configured to be in fluid communication with the cutting station 310 within the enclosure to provide a negative pressure and thus facilitate the extraction of fumes from laser trimming activity within the enclosure 318. The laser chiller 315 is also configured to be in communication with the cutting station 310 and components thereof (described in subsequent figures) to provide cooling effects and prevent overheating of components of cutting station 310 from laser trimming activity.

The system 300 is also shown to include a control cabinet 314, as shown in FIG. 3. The control cabinet 314 is positioned adjacent to the enclosure 318 and the cutting station 310. The control cabinet 314 is configured to house various components of the system 300, which may include power sources or connections, circuitry, communication means with other systems and/or components, as well as components configured to receive and implement various user/operator preferences that may be applied to one or more components of the system 300. Additionally, the control cabinet 314 may house components such as those shown in FIG. 1 including various subsystems of the system 100 and their components, such as the image processor 110 and the trim line database 112, for example.

Referring now to FIG. 4, an alternate view of the system 300 of FIG. 3 is shown, specifically the cutting station 310 within the enclosure 318. FIG. 4 is shown to include the system 300, the conveyor 306, and the dental model 102 to be picked from the pallet 304 as shown and discussed in FIG. 3.

The system 300 includes a transfer station 320, as shown in FIG. 4. The transfer station 320 receives the pallet 304 containing the dental model 102 via the conveyor 306. The transfer station 320 is shown to include a transfer tool 322 arranged at the transfer station 320. The transfer tool 322 may include, for instance, a plurality of pins or pick features. The transfer tool 322 is configured to pick the dental model 102 with the material thermoformed thereon up from the pallet 304 and to retain them. The transfer tool 322 may include a plurality of pins 222 which pierce the material thermoformed to the dental model 102. For instance, as shown in FIG. 2A, the pins 222 may be configured to pierce the excess portion 200 of the material. The excess portion 200 of the material may be a portion of the material which is not in contact with the dental model 102. The transfer tool 322 may push the pins 222 into the excess portion 200 of the material to form holes which hold and retain the material and the dental model 102. By piercing the excess portion 200 of the material, the transfer tool 322 may be configured to move, lift, pivot, rotate, or otherwise adjust the position of the dental model 102 and material thermoformed thereto.

The transfer tool 322 is shown to be coupled to a linear stage 324 as well as a rotary stage 326, as shown in FIG. 4. The linear stage 324 is configured to provide linear movement of the transfer tool 322 within the transfer station 320 for picking up and retaining the dental model 102. The rotary stage 326 is configured to provide rotational movement of the transfer tool 322 within the transfer station 320 for positioning the dental model 102 in a viewable region for the camera 122, as described in greater detail below.

The system 300 is further shown to include a camera 122, as shown in FIG. 4. The camera 122 is configured to function cooperatively with a light source 330, which is located adjacent to the camera 122. The camera 122 is shown to have a field of view which is directed toward the transfer tool 322. The light source 330 may be configured to illuminate an area of the dental model 102 as the transfer tool 322 rotates the dental model 102 toward the camera 122 to expose a portion of the underside of the dental model 102 (e.g., including the data matrix 214 and reference point 216). As such, the light source 330 may provide lighting conditions for the camera 122 to capture images of the dental model 102, such as the data matrix 214 and the reference point 216. The orientation determination system 108 may determine the orientation/position of the dental model 102 based on the images captured by the camera 122, as described in greater detail above.

Figure 5:
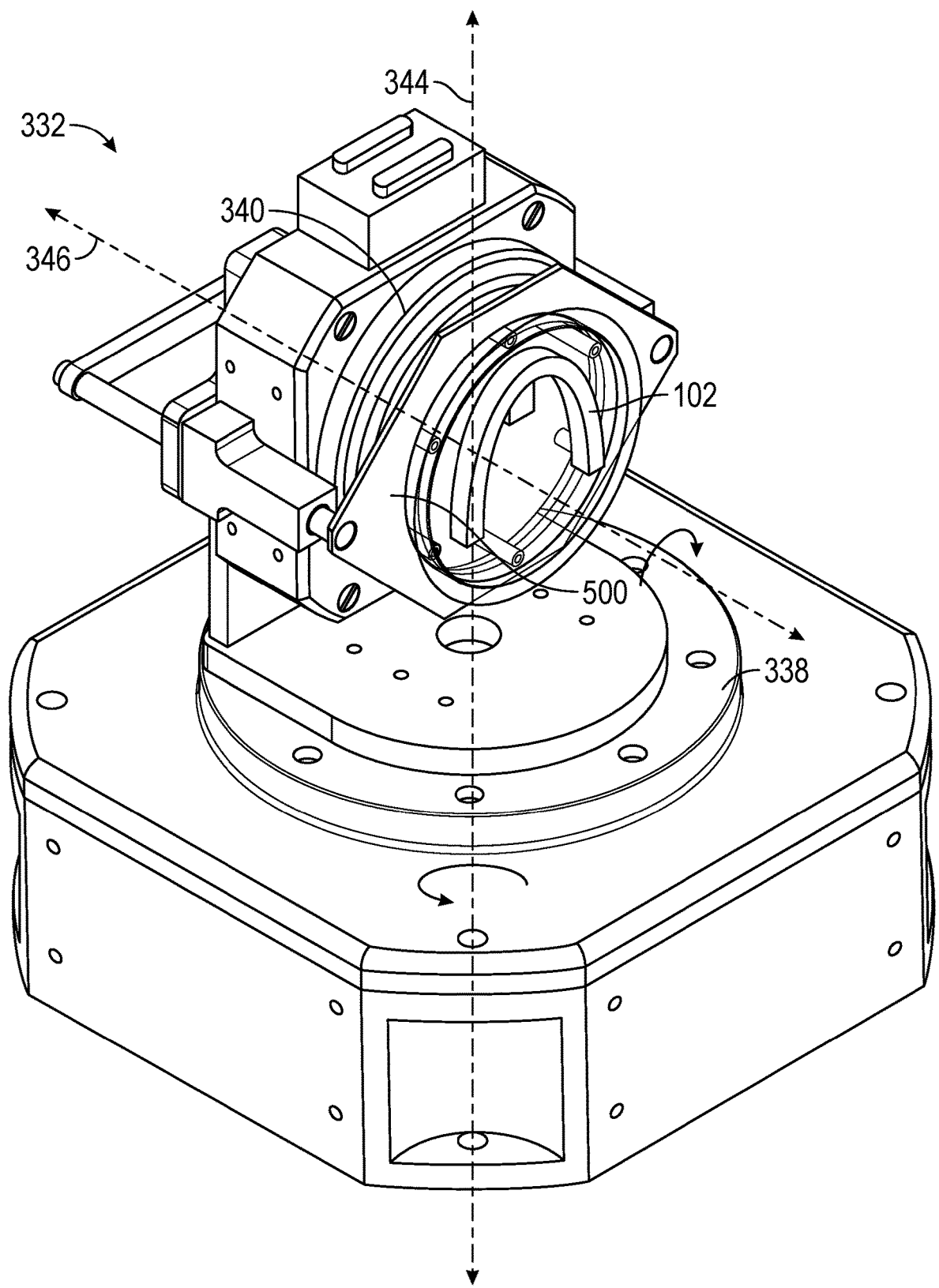
FIG. 5 is an illustration of a perspective view of a fixture stage of the system for trimming dental aligners, according to an illustrative embodiment.

Referring now to FIG. 5, depicted is a perspective view of a fixture stage 332. As shown in FIG. 4 and FIG. 5, the system 300 is also shown to include a fixture stage 332. In some embodiments, the fixture stage 332 includes a fixture plate 500 configured to receive and retain the dental model 102 and excess material 200. The fixture plate 500 includes features which are configured to interface with the features described above with respect to the dental model (e.g., such as the retention mechanism 210 and a post or protrusion). The fixture stage 332 may be configured to receive the dental model 102. Following capturing of the image(s) via the camera 122, the transfer tool 322 rotates the dental model 102 from the camera 122 toward the fixture stage 332. The transfer tool 322 is configured to push the dental model 102 off the transfer tool 322 and onto the fixture stage 332. The dental model 102 may engage the fixture stage 332 by pushing the recess 212 onto a retention mechanism and a bore 220 onto the post or protrusion of a fixture plate 500 of the fixture stage 332. Following mounting, the dental model 102 is configured to move with the fixture stage 332 as the material is cut from the dental model 102. The fixture stage 332 is configured to move along two axes 344, 346. The fixture stage 332 is configured to rotate along or about a first axis 344 via first cutting rotary stage 338 and along or about a second axis 346 (perpendicular to the first axis 344) via a second cutting rotary stage 340. Together, the first and second cutting rotary stage 338, 340 are configured to provide two axes of movement by which the dental model 102 may be cut. In some implementations, further stages may be provided for different forms of movement (e.g., a linear stage by which the fixture stage 332 is moved along an X axis, a liner stage by which the fixture stage 332 is moved along a Y axis, etc.). In such implementations, the fixture stage 332 may be configured to move in more than two axes. For example, the fixture stage 332 can be configured to move in two axes, three axes, four axes, five axes, six axes, seven axes, eight axes, nine axes, ten axes, and so on.

Figure 6:
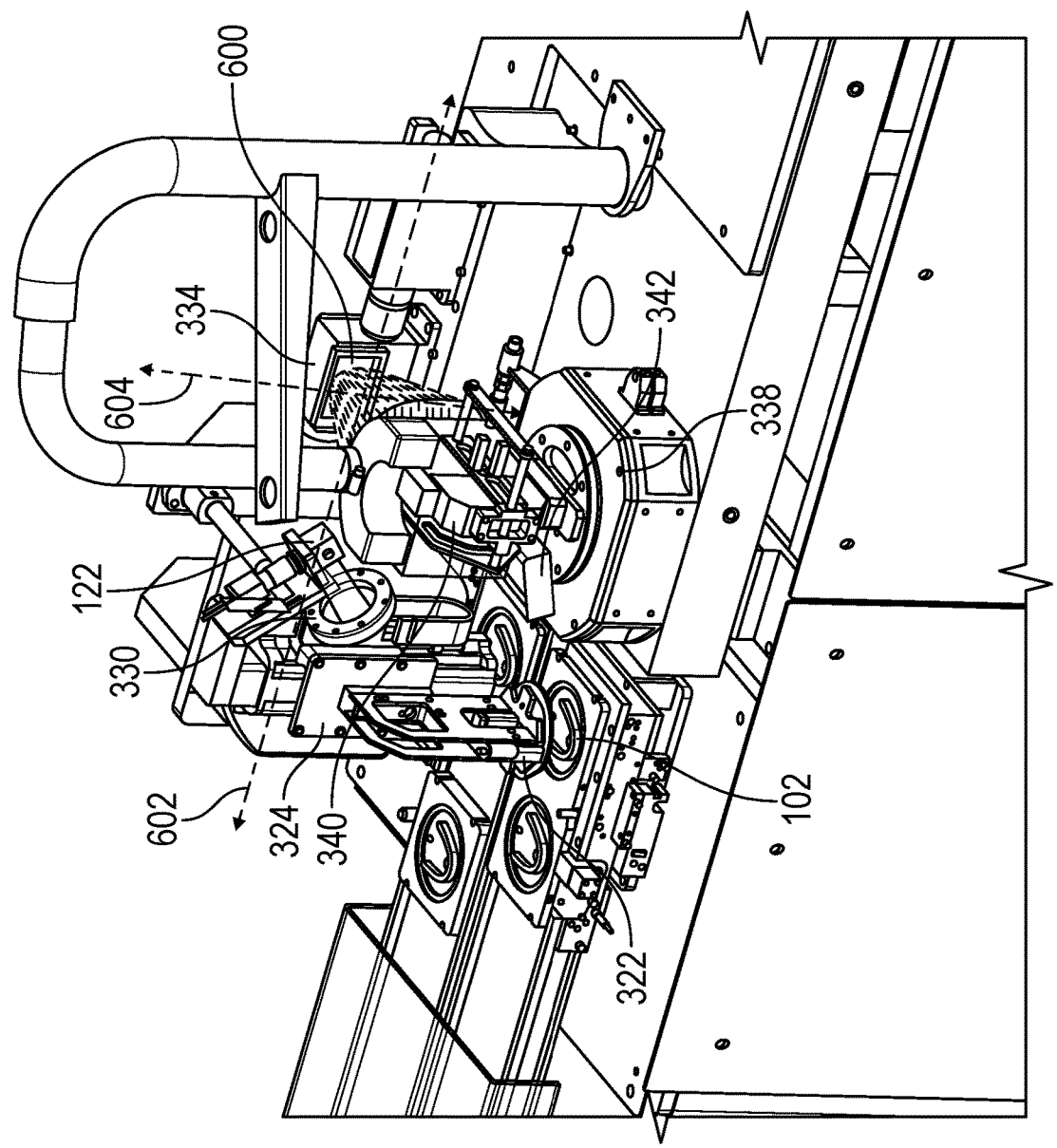
FIG. 6 is an illustration of a side view of a laser trimming system, according to an illustrative embodiment.

FIG. 6 depicts a side view of the laser trimming system 126, according to an illustrative embodiment. The system 300 is also shown to include a laser 334. The laser 334 is shown to be mounted on a stage 600 and positioned adjacent the cutting station 310. In some embodiments, the stage 600 may be a linear stage, a rotary stage, or a galvo head. The stage 400 is configured to provide movement in two directions (e.g., along a first (or X) axis 602 and a second (or Y) axis 604 perpendicular to the first axis 602). As such, the stage 400 may provide two axes of motion. The laser 334 is directed toward the dental model 102. In some implementations, the laser trimming system 126 is configured to modify a power of the laser 334. By modifying the power of the laser 334 (e.g., by limiting or restricting a power provided to the laser 334 or otherwise throttling the laser 334), the laser trimming system 126 is configured to change a distance at which the laser 334 cuts a surface (e.g., the dental model 102). By changing the distance at which the laser 334 cuts a surface, the laser trimming system 126 is configured to provide another axis (e.g., along a Z axis) by which the laser trimming system 126 is configured to cut the dental model 102. Accordingly, the laser 334 and stage 600 are configured to provide, at least, three axes along which the dental model 102 is cut.

Together, the first and second cutting stage 338, 340, the stage 600, and the laser trimming system 126 are configured to provide five axes of movement by which the dental model 102 is cut. Each stage 338, 340, 600 (and laser trimming system 126) may be controlled independently to rotate the dental model 102, pivot the dental model 102, lift or lower the laser 334 relative to the dental model 102, angle the laser 334 relative to the dental model 102, change a distance or depth in which the dental model 102 is cut, and so forth. By providing, at least, five axes of movement by which the dental model 102 is cut, the dental aligners 700 produced by the laser trimming system 126 may be cut and prepared more accurately than traditional cutting systems, thereby producing better fitting dental aligners 700 and dental aligners 700 which are more comfortable to wear. In some embodiments, cutting the material over three axes of movement is facilitated by the galvo head of the laser trimming system 126, and cutting the material over two additional axes of movement is facilitated by motion of the dental model 102 via the first and second cutting stage 338, 340. As such, the material can be cut using five axes of movement.

Prior to the laser 334 trimming the material from the dental model 102 to produce the dental aligners 700, the cutting rotary stage 338 may position and reposition, and otherwise adjust the fixture stage 332 which includes the fixture plate 500 and the dental model 102 with the material thermoformed thereon. The cutting rotary stage 338 may position the fixture stage 332 such that the dental model 102 with the material is in a position where the laser 334 cuts at least one of the thermoformed material and the dental model 102 at the starting (or first) position of the trim line following compensation of the trim line for the offset of the position of the dental model 102 on the fixture plate 500. The rotary stages 338, 340 of the fixture stage 332 manipulate and move the dental model 102 and the fixture plate 500 about two (or more axes), and the laser 334 is moved about three axes via the stage 400 such that the laser 334 continues to follow the path of the trim line 118, thus removing excess material from the dental model 102 to produce a dental aligner 700. Upon completion of trimming the thermoformed material and the dental model 102 and reaching the end point of the trim line 118, the dental model 102 and resulting dental aligner 700 is ejected from the fixture plate 500 and the dental model 102 and the aligner 700 travel down one or more chutes, such as chute 342. The chute 342 is arranged beneath the cutting station 310, and is angled such that it directs the dental model 102 and the aligner 700 into a storage space after laser cutting.

Figure 7:
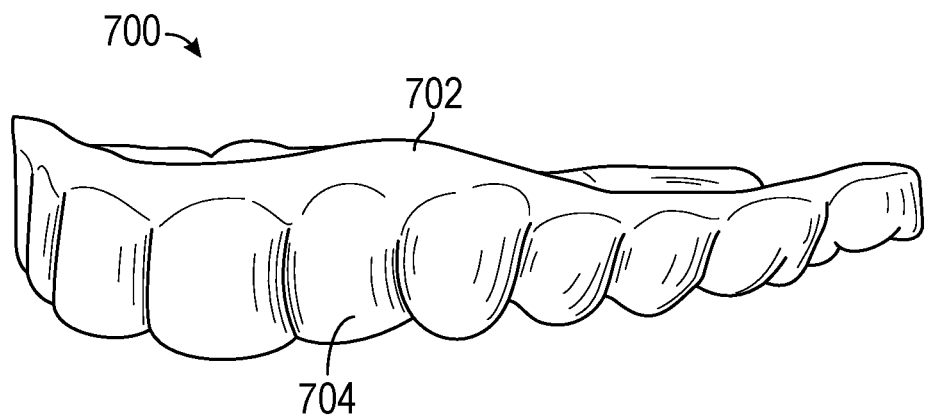
FIG. 7 is an illustration of a dental aligner fabricated using the system for trimming dental aligners of FIG. 1, according to illustrative embodiments.

Referring now to FIG. 7, a dental aligner 700 is shown. In FIG. 7, the dental aligner 700 has been trimmed, ejected from the fixture plate 500 and removed from the dental model 102. In other words, the dental aligner 700 is shown trimmed from the dental model 102 and is ready to be worn by a user, and the dental aligner 700 is no longer molded to the dental model 102. As mentioned previously, the dental aligner 700 is generated using a thermoformed material and one or more thermoforming methods in conjunction with thermoforming system 104 as shown in FIG. 1. The dental aligner of FIG. 7 is shown to include a gingiva portion 702 and a teeth portion 704. The gingiva portion 702 is configured to interface with the gingiva of the user. The gingiva portion 702 is a portion of the dental model 102 which corresponds to oral features of the user including the user's gingiva. The teeth portion 704 is configured to interface with the teeth of the user. The teeth portion 704 is a portion of the dental model 102 which corresponds to oral features of the user including the user's teeth.

Figure 8:
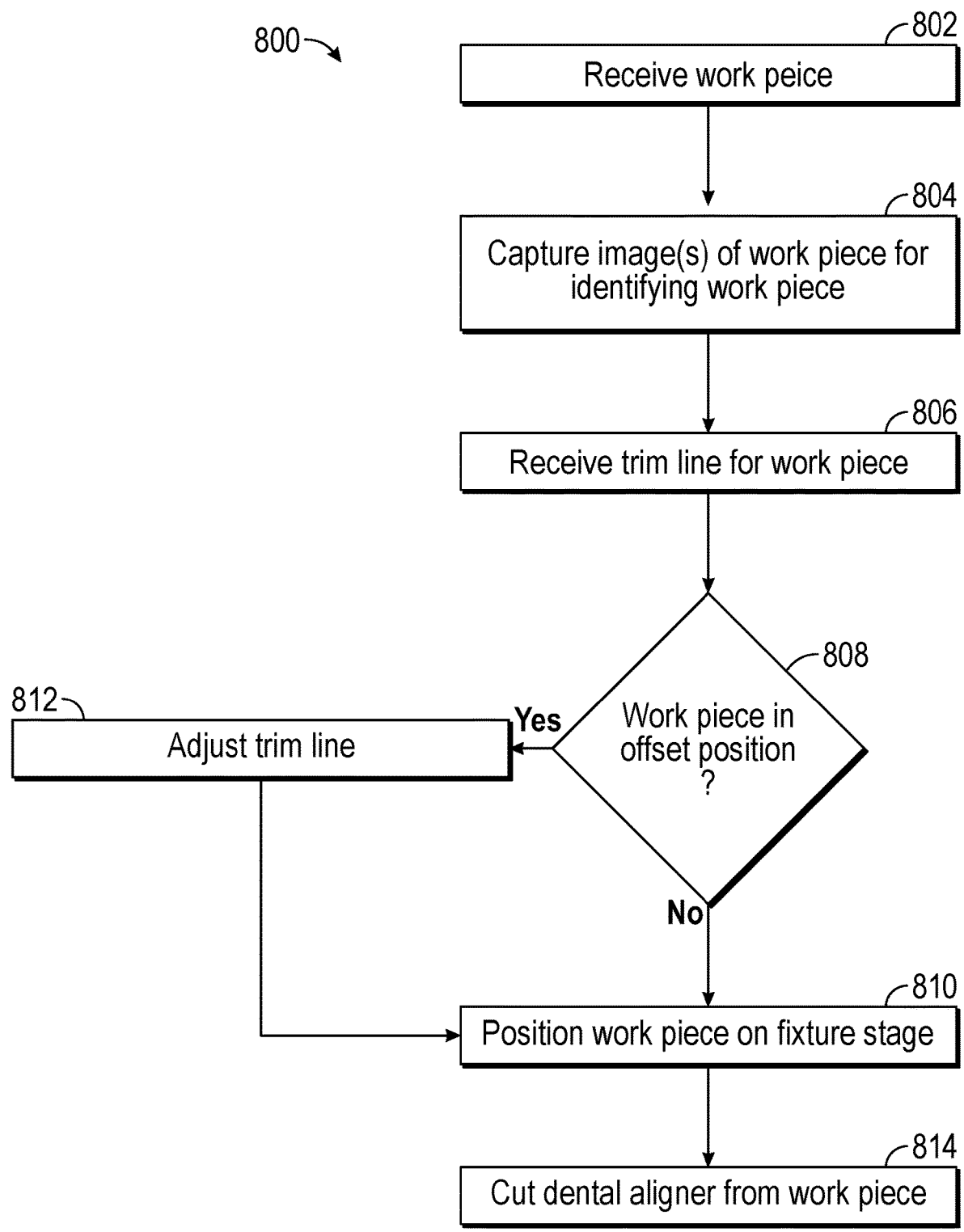
FIG. 8 is a flowchart of a method for trimming a dental aligner, according to an illustrative embodiment.

Referring now to FIG. 8, a flowchart of a method 800 of trimming a dental aligner 700 is shown, according to an illustrative embodiment. The method 800 may be implemented by any combination of the components described herein.

At operation 802, the model positioning system 124 receives a dental model 102 of a dental arch of a user with material thermoformed thereon (together referred to as a work piece). The dental model 102 includes material thermoformed to and in contact with the dental model 102. The dental model 102 includes an orientation feature. The orientation feature may be or include any feature located or otherwise incorporated on a surface of the dental model 102 and configured to provide information for determining an orientation of the dental model 102. The orientation feature may be, for instance, a corner of the data matrix 214, which defines a reference point 216 for the dental model 102. The reference point 216 may be defined in reference to an edge 218 of the dental model 102. The reference point 216 may include a first line extending parallel to the edge 218 and along a first side of the data matrix 214 and a second line extending perpendicular to the edge 218 and along a second side of the data matrix 214. The first and second line together form a 90° corner of the data matrix 214 used for identifying an offset of the dental model 102, as described in greater detail below. The data matrix 214 includes data encoded therein. The data matrix 214 may be, for instance, a QR code. The data encoded in the data matrix 214 may be a unique identifier associated with the dental model 102. The unique identifier may be used for selecting a trim line for trimming the material from the dental model 102 to generate the dental aligner 700.

The model positioning system 124 receives the work piece from a thermoforming system 104. The model positioning system 124 may receive the work piece from the thermoforming system 104 via automated devices/components, such as robotic arms, conveyors, etc. In some implementations, a user (such as an operator) may position or otherwise load the dental model 102 on a pallet 302. The user may load the dental model 102 on a pallet 302 in a queue for processing. For instance, the user may load the dental model 102 on the pallet 302 in a queue following thermoforming the material to the dental model 102, or the user may load the dental model 102 on the pallet 302 in a queue to be thermoformed and trimmed. The user may load the dental model 102 on the pallet 302, which is located on a conveyer belt. The conveyor belt may be a component of the model positioning system 124, or the conveyor belt may be a component of the overall system (e.g., extending from the thermoforming system 104, through the model positioning system 124, and to the laser trimming system 126).

In receiving the work piece, the model positioning system 124 may be configured to pick up and retain the work piece. The model positioning system 124 may rotate, pivot, or otherwise move a transfer tool 322 having a plurality of pins 222 into a position which faces the work piece (e.g., rotate from a horizontal position 90° into vertical down position). The transfer tool 322 may include a series of pins 222 or other components that pierce an excess portion of the material thermoformed to the dental model 102. The model positioning system 124 may extend (e.g., move into an extended position in the direction of the dental model 102) toward the work piece aligned therewith to pick up the dental model 102. The model positioning system 124 may include a transfer tool 322 having a plurality of pins 222 configured to pierce a portion of the excess material 200 thermoformed to the dental model 102. For instance, the pins 222 may pierce the portion of the excess material 200 thermoformed to the dental model 102 which is not in direct contact with the dental model 102 (e.g., to preserve the integrity of the material which is in contact with the dental model) 102). In piercing the material thermoformed to the dental model 102, the model positioning system 124 may be configured to lift, rotate, pivot, move, and otherwise manipulate the dental model 102.

At operation 804, the orientation determination system 108 captures image(s) of the work piece for identifying the work piece. The model positioning system 124 may manipulate the work piece to expose various portions of the work piece to a camera 122 of the orientation determination system 108. In some implementations, the model positioning system 124 moves the work piece by initially retracting the work piece (e.g., moving the transfer tool 322 from the vertical down position in which the pins 222 pierced the excess portion of the material into a vertical retracted position) to lift the work piece. The model positioning system 124 then rotates the transfer tool 322 toward the camera 122 (e.g., to thereby rotate the work piece toward the camera 122). The model positioning system 124 may rotate the transfer tool 322 from the vertical retracted position 135° toward the camera 122 to expose the orientation feature to the camera 122. The model positioning system 124 pauses with the work piece exposed to the camera 122 so that the camera 122 is capable of capturing an image of the orientation feature. The camera 122 captures the images of the dental model 102 including the orientation feature. Following capturing the images, the camera 122 communicates the image(s) to various other components within the orientation determination system 108 for determining an orientation of the dental model 102.

At operation 806, the trim line identifier 128 receives a trim line for the work piece. The data matrix 214 includes a unique identifier corresponding to the dental model 102 encoded therein. The decoder 116 of the image processor 110 receives the image(s) from the camera 122 of the dental model 102. The decoder 116 identifies the data matrix 214 within the image(s) of the dental model 102. The decoder 116 may identify the data matrix 214 based on the reference point 216 of the data matrix 214. The decoder 116 may parse the data matrix 214 to identify a unique identifier encoded in the data matrix 214. In some implementations, the decoder 116 confirms the unique identifier by cross-referencing the model identification code 224 on the dental model 102 with model identification codes associated with the unique identifier. The decoder 116 may provide the decoded unique identifier to the trim line identifier 128. The trim line identifier 128 may select the trim line by cross-referencing the unique identifier from the decoder 116 with unique identifiers 120 in a trim line database 112. The trim line database 112 may include a plurality of trim lines 118 associated with respective dental models 102 and corresponding unique identifiers 120. The trim line identifier 128 may perform a look-up function of the unique identifier in the trim line database 112 to select a corresponding trim line 118 for the dental model 102.

At operation 808, the orientation determination system 108 determines whether there is an offset of the work piece. The orientation determination system 108 determines whether there is an offset of the work piece based on the position of the orientation feature on the dental model 102 as captured by the camera 122. Where the orientation feature is the reference point 216, the image processor 110 may include a line detector 114 for identifying the lines which make up or otherwise form the reference point 216. The orientation determination system 108 may determine the orientation of the reference point 216 within the image captured by the camera 122 based on an orientation of the reference point 216 within the image.

In some embodiments, to determine whether an offset is present, the orientation determination system 108 may store a known position and orientation of the camera 122 when the camera 122 captures the image(s) of the dental model 102. As stated above, the reference point 216 may be positioned in a known location relative to an edge 218 of the dental model 102. The image processor 110 processes the image(s) from the camera 122 to identify the orientation feature of the dental model 102. Since the orientation/position of the camera 122 is known, the image processor 110 determines the orientation of the dental model 102 based on the orientation of the reference point 216 within the image.

In some embodiments, to determine whether an offset is present, the image processor 110 may compare the orientation of the reference point 216 within the image with one or more stored images corresponding to a known orientation of a sample dental model. The image processor 110 may determine whether the orientation of the reference point matches the orientation of sample a reference point of the sample dental model. Where the orientations do not match, the orientation determination system 108 determines that an offset is present. The orientation determination system 108 can determine the degree offset based on a comparison of the lines which form the reference point 216. For example, where the reference point is known to form a 90° angle and the image captured by the camera 122 is overlaid onto a sample image, the orientation determination system 108 can determine the degree offset based on one of the lines in the image captured by the camera in comparison to a corresponding line in the sample image.

Where an offset is not present, the method 800 proceeds to operation 810, where the model positioning system 124 positions the work piece on a fixture stage 332. Where an offset is present, the method 800 proceeds to operation 812, where the trim line identifier 128 adjusts the trim line (e.g., at operation 806) to compensate for the offset identified at operation 808.

At operation 812, the trim line identifier 128 adjusts the trim line to compensate for the offset of the dental model 102. The trim line identifier 128 may adjust the trim line by rotating the trim line by the degree offset. For instance, where the work piece is offset by 2°, the trim line identifier 128 may rotate the trim line by 2° in the same direction as the offset of the work piece. Each trim line may include a starting point. The starting point may be a point at which the laser trimming system 126 first cuts the material from the dental model 102. The trim line identifier 128 may select, identify, or otherwise determine a first point on the work piece corresponding to the starting point of the trim line to compensate for the offset of the work piece.

At operation 810, the model positioning system 124 positions the work piece on the fixture stage 332. In some embodiments, the model positioning system 124 may rotate the transfer tool 322 from a position in which the work piece is exposed to the camera 122 (e.g., 45° from the position in which the model positioning system 124 pauses for capturing the image at operation 804) toward a hand off position. The model positioning system 124 may extend the transfer tool 322 for handoff of the work piece to the fixture stage 332. The fixture stage 332 includes a fixture plate 500 having geometry allowing for the work piece to remain in contact with the fixture plate 500 via interfacing complimentary geometrical components (such as pins and bores, for example) of the fixture plate 500 and the dental model 102. The model positioning system 124 may position the dental model 102 on the fixture plate 500 of the fixture stage 332 by extending the transfer tool 322 toward the fixture stage 332 to force the work piece onto the fixture plate 500 (e.g., by pushing the work piece onto piercing pins similar to those described above, or other features of the fixture plate 500 designed or implemented to engage and retain the work piece). The model positioning system 124 may retract the transfer tool 322 from the extended position (e.g., in which the work piece is pushed onto the fixture plate 500), and rotate back for picking a subsequent work piece.

The fixture stage 332 manipulates/rotates/moves/etc. the dental model 102 during laser trimming by the laser 334. The fixture stage 332 may rotate, move, pivot, etc. via various rotary stages 338, 340 which are operatively connected thereto. The fixture stage 332 may rotate via a plurality of cutting rotary stages 338, 340. The laser 334 may move relative to the fixture stage 332 via stage 600. The fixture stage 332 may first rotate the work piece (e.g., 90°) towards the laser 334 for laser trimming. The laser 334 may move laterally or pivot (e.g., along two perpendicular axes). The laser trimming system 126 may control power to the laser 334 to change the depth at which the laser 334 cuts, effectively moving the laser 334 relative to the fixture stage 332 along a third axis. Similarly, the first and second rotary stages 338, 340 may rotate and pivot the work piece about two axes. Together, the fixture stage 332 and laser 334 may together provide at least five axes by which the dental model 102 is cut.

At operation 814, the laser trimming system 126 cuts a dental aligner 700 from the work piece. The laser trimming system 126 may cut the excess material 200 thermoformed onto the dental model to generate, create, or otherwise produce the dental aligner 700. The laser trimming system 126 may trim the excess material 200 from the dental model 102 along the trim line (e.g., received at operation 806) beginning at the first point identified at operation 812 to compensate for the identified offset of the dental model. The fixture stage 332, which is coupled to the work piece, is configured to manipulate the work piece such that the laser 334 trims the thermoformed material from the dental model 102 along the trim line, thus preparing the dental aligner 700 for user by the user. Similarly, the laser trimming system 126 may move the laser around the work piece (e.g., and at different cutting depths) such that the laser 334 follows the trim line.

Once the laser trimming system 126 trims the material from the dental model 102 to generate the dental aligner 700, the cutting rotary stage 338 may rotate the work piece away from the laser trimming system 126. The cutting rotary stage 338 may rotate the work piece 180° away from the laser trimming system 126 and toward a chute 342. When the fixture stage 332 is aligned with the chute 342, the fixture stage 332 pushes the work piece with the trimmed material into the chute 342. The dental aligner may be separated (e.g., manually or automatically) from the fixture plate/dental model 102, further processed (e.g., by smoothing edges, for instance, polishing, etc.), packaged, and shipped to a user for repositioning one or more teeth of the user. Following pushing the work piece off the fixture stage 332, the cutting rotary stage 338 rotates the fixture stage 332 back toward the transfer tool 322 for receiving a subsequent work piece for laser trimming.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be X, Y, or Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, flash memory, hard disk storage) for storing data and/or computer code for completing or facilitating the various processes, layers and circuits described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods shown in the various exemplary embodiments are illustrative only. Additionally, any element disclosed in one embodiment may be incorporated or utilized with any other embodiment disclosed herein.

What is claimed is:

1. A system comprising:
an orientation determination system comprising a camera, the camera configured to capture an image of an orientation feature of a physical dental model of a dental arch of a customer with material thermoformed thereon, the orientation determination system configured to identify an offset of the physical dental model with respect to a fixture plate during positioning or before or after the physical dental model is positioned on the fixture plate by determining an actual orientation of the physical dental model based on the orientation feature; and
a laser trimming system configured to cut the material along a trim line based on the identified offset while the fixture plate is moved about at least two axes to produce a dental aligner specific to the customer and being configured to reposition one or more teeth of the customer.

2. The system of claim 1, wherein the laser trimming system is configured to cut the material using five axes of movement.

3. The system of claim 2, wherein the five axes comprise two axes defined by two rotary stages upon which the fixture plate is operatively coupled, two axes defined by a stage upon which a laser of the laser trimming system is operatively coupled, and a cutting direction of the laser.

4. The system of claim 1, further comprising a model positioning system configured to move the physical dental model to a position in which the orientation feature is viewable by the camera.

5. The system of claim 1, further comprising a model positioning system configured to move the physical dental model to expose the orientation feature and to move the physical dental model toward the fixture plate.

6. The system of claim 1, wherein the orientation feature comprises a data matrix having a unique identifier encoded therein and corresponding to the physical dental model, and wherein the orientation determination system is further configured to:
decode, based on the image captured by the camera, the data matrix to identify the unique identifier associated with the physical dental model; and
retrieve data associated with the trim line for cutting the material thermoformed on the physical dental model from a database.

7. A system comprising:
a model positioning system configured to move a physical dental model of a dental arch of a customer having a material thermoformed thereon and having an orientation feature, the model positioning system configured to move the physical dental model so that the orientation feature is viewable by a camera;
an orientation determination system configured to identify an offset of the physical dental model during positioning or before or after the physical dental model is positioned on a fixture plate based on an image of the orientation feature captured by the camera; and
a laser trimming system configured to cut the material along a trim line based on the identified offset while the fixture plate is moved about at least two axes to produce a dental aligner specific to the customer and being configured to reposition one or more teeth of the customer.

8. The system of claim 7, wherein the laser trimming system is configured to cut the material using at least five axes of movement, wherein the at least five axes comprise two axes defined by two rotary stages upon which the fixture plate is operatively coupled, two axes defined by a stage upon which a laser of the laser trimming system is operatively coupled, and a cutting direction of the laser.

9. The system of claim 7, wherein the orientation determination system is further configured to identify a starting point for the laser trimming system to begin cutting the material based on the offset.

10. The system of claim 7, wherein the model positioning system comprises a plurality of piercing pins configured to pierce an excess portion of the material thermoformed to the physical dental model.

11. The system of claim 10, wherein the model positioning system is configured to position the physical dental model on the fixture plate by pushing the physical dental model off the plurality of piercing pins and onto one or more engaging features of the fixture plate.

12. The system of claim 7, wherein the orientation feature is positioned on a bottom surface of the physical dental model opposite a tooth portion of the physical dental model, and wherein the model positioning system is configured to rotate the physical dental model to expose the orientation feature to the camera.

13. The system of claim 12, wherein the model positioning system is configured to start moving the physical dental model toward the fixture plate before the camera captures the image.

14. A system comprising:
an orientation determination system comprising a camera, the camera configured to capture an image of an orientation feature of a physical dental model of a dental arch of a customer with material thermoformed thereon, the orientation determination system configured to identify an offset of the physical dental model during positioning or before or after the physical dental model is positioned on a fixture plate based on the image of the orientation feature;
a laser trimming system configured to cut the material along a trim line based on the identified offset while the fixture plate is moved about at least two axes to produce a dental aligner specific to the customer and being configured to reposition one or more teeth of the customer.

15. The system of claim 14, wherein the laser trimming system is configured to cut the material using at least five axes of movement.

16. The system of claim 15, wherein the at least five axes are defined by two rotary stages upon which the fixture plate is operatively coupled, two axes defined by a stage upon which a laser of the laser trimming system is operatively coupled, and a power modification of the laser to modify a cutting depth of the laser.

17. The system of claim 14, wherein the orientation determination system is configured to identify the offset of the physical dental model by determining an actual orientation of the physical dental model.

18. The system of claim 14, wherein the orientation feature comprises at least two lines that define a 90° corner, and wherein the orientation determination system is configured to identify the offset by:
   identifying the 90° corner defined by the at least two lines; and
   determining the offset based on a known orientation of the camera with respect to the 90° corner.

19. The system of claim 14, wherein the orientation feature comprises a data matrix having a unique identifier encoded therein and corresponding to the physical dental model, and wherein the orientation determination system is further configured to decode the data matrix to identify the unique identifier associated with the physical dental model.

20. The system of claim 19, wherein the orientation determination system is further configured to retrieve, from a database, data associated with the trim line for cutting the material thermoformed on the physical dental model.

* * * * *